United States Patent
Rembold et al.

[11] Patent Number: 6,058,912
[45] Date of Patent: May 9, 2000

[54] FUEL SUPPLY SYSTEM AND METHOD FOR OPERATING AN INTERNAL COMBUSTION ENGINE

[75] Inventors: Helmut Rembold, Stuttgart; Hans Deichsel, Murr; Heinz Stutzenberger, Vaihingen; Uwe Mueller, Korntal-Muenchingen, all of Germany

[73] Assignee: Robert Bosch GmbH, Stuttgart, Germany

[21] Appl. No.: 08/655,198

[22] Filed: May 28, 1996

[30] Foreign Application Priority Data

| May 26, 1995 | [DE] | Germany | 195 19 300 |
| Oct. 26, 1995 | [DE] | Germany | 195 39 883 |

[51] Int. Cl.7 ............................................. F02M 37/04
[52] U.S. Cl. .................. 123/516; 123/456; 123/179.17
[58] Field of Search ................................ 123/447, 446, 123/179.17, 456, 516, 514, 198 D

[56] References Cited

U.S. PATENT DOCUMENTS

| 4,274,380 | 6/1981 | de Vulpillieres | 123/456 |
| 4,541,385 | 9/1985 | Eheim | 123/447 |
| 4,572,136 | 2/1986 | Takeuchi et al. | |
| 4,719,889 | 1/1988 | Amann | 123/456 |
| 4,884,545 | 12/1989 | Mathis | 123/446 |
| 5,168,855 | 12/1992 | Stone | 123/446 |
| 5,404,855 | 4/1995 | Yen et al. | |
| 5,441,026 | 8/1995 | Akimoto | 123/198 D |
| 5,447,138 | 9/1995 | Barnes | 123/179.17 |
| 5,456,233 | 10/1995 | Felhoker | 123/456 |
| 5,558,068 | 9/1996 | Kunishima | 123/516 |
| 5,577,479 | 11/1996 | Popp | 123/447 |

FOREIGN PATENT DOCUMENTS

| 0299337 | 1/1989 | European Pat. Off. . |
| 62-237057 | 10/1987 | Japan . |
| 2274138 | 7/1994 | United Kingdom . |

OTHER PUBLICATIONS

ATZ, Automobiltechnische Zeitschrift, Nr. 8, Aug. 1955 p. 213–p. 227, Fig. 7 (Bild 7).

*Primary Examiner*—Carl S. Miller
*Attorney, Agent, or Firm*—Ronald E. Greigg; Edwin E. Greigg

[57] ABSTRACT

A fuel supply system with two series-connected pumps and fuel injection valves that inject fuel directly into a combustion chamber of an engine. The system includes a relief device. In a simple embodiment, the relief device can assure that the pressure in the pressure line can drop when the engine has been shutoff. The relief line may, however, also be embodied such that during the entire time of engine operation, the pressure in the pressure line can be lowered at any time as needed. The apparatus and the method are intended for an internal combustion engine of a vehicle.

26 Claims, 11 Drawing Sheets

FUEL SUPPLY SYSTEM AND METHOD FOR OPERATING AN INTERNAL COMBUSTION ENGINE

BACKGROUND OF THE INVENTION

The invention is based on a fuel supply system for furnishing fuel for an internal combustion engine and to a method for operating an internal combustion engine as defined hereinafter.

Until now, there have been fuel supply systems in which a first fuel pump pumps fuel from a fuel tank to a second fuel pump via a fuel connection. The second fuel pump in turn feeds the fuel via a pressure line to at least one fuel injection valve. Typically, the number of fuel injection valves is equal to the number of cylinders of the engine. The fuel supply system may be constructed such that the fuel injection valves inject the fuel directly into an engine combustion chamber. In operation of this fuel supply system, high pressure in the pressure line leading to the fuel injection valve is necessary.

Since during operation of the engine, a high pressure prevails in the fuel connection and even more in the pressure line leading to the fuel injection valve, problems can arise unless this high pressure is reduced after the engine is shut off. Unless this high pressure is reduced, fuel can escape to the outside, in repair situations. Unless the pressure line is pressure-relieved, the danger exists that if one of the fuel injection valves leading into the combustion chamber does not close fully, then when the engine is shut off fuel will enter a combustion chamber of the engine.

OBJECT AND SUMMARY OF THE INVENTION

The fuel supply system of the invention and the method of the invention because of the relief device provided, offer the advantage that the pressure of the fuel in the pressure line can be lowered, if the instantaneous operating condition of the engine requires this.

Advantageous further features of and improvements to the fuel supply system and the method are possible with the provisions recited hereinafter.

If the relief device is designed such that the fuel is carried out of the pressure line into the fuel tank via the fuel connection, then this offers the advantage of requiring no or only slight additional line courses for the relief device.

Since a substantially lower pressure prevails in the fuel connection than in the pressure line, it is adequate in some applications of the fuel supply system if the engine is shut off, only the pressure in the pressure line can drop in the direction of the fuel connection. This advantageously produces an embodiment that is especially simple to manufacture.

If the relief device is designed such that the fuel is carried from the pressure line into the fuel tank, bypassing the fuel connection, then this offers the advantage that the pressure reduction in the pressure line is not hindered by the hydraulic resistance of the fuel connection or by other valves in the region of the first fuel pump.

It is possible for the relief device to be made with throttles of constant cross section. This offers the advantage that upon shutoff of the fuel pumps, the pressure in the pressure line drops relatively quickly, depending on the flow cross section of the throttles. Advantageously, no additional adjusting force (such as the adjusting force of an electromagnet) is needed to do so.

If the relief device is electrically controllable, this offers the advantage that a control unit can be provided which, depending on the engine operating condition, monitors the pressure in the pressure line as needed as a function of a program input into the control unit. For instance, the control unit may be designed such that it lowers the pressure in the pressure line not only after shutoff of the engine but even during engine operation, for instance in order to lower the pressure in the pressure line in the partial-load range, compared with the pressure prevailing during the full-load range.

The relief device may for instance include a switching valve that has two switching positions. This offers the advantage of embodying the fuel supply system such that with the relatively simple valve, a rapid pressure reduction in the pressure line is possible.

The relief device may for instance also be provided with a relief valve that has a number of intermediate switching positions. This offers the advantage that the pressure in the pressure line can be lowered very sensitively and as needed.

It is also possible to provide the fuel supply system with a relief valve device that varies the feed pressure in the fuel connection. This affords an advantageous capability of fast, reliable starting of the engine.

If the valve device is formed by a blockable pressure controller, then this advantageously substantially lowers the requisite construction expense and the number of parts needed.

The effect of the return line leading out of the pressure line into the fuel connection is that at least some of the excess fuel pumped by the second fuel pump can flow out of the pressure line into the fuel connection, which has the advantage that the fuel in the fuel tank does not heat up as severely.

With the return leading out of the pressure line into the fuel tank, the pressure line can advantageously be flushed. A return line leading into the fuel tank offers the advantage in particular that any vapor bubbles emerging from the fuel line are diverted into the fuel tank.

If the throttle in the return line extending in the fuel tank can be controlled as a function of temperature and/or pressure, then this offers the advantage that the fuel supply system can be especially expediently adapted to the particular prevailing operating condition (such as cold start, hot start, normal operation, and so forth).

The invention will be better understood and further objects and advantages thereof will become more apparent from the ensuing detailed description of preferred embodiments taken in conjunction with the drawings.

DETAILED DESCRIPTION OF THE PREFERRED EMBODIMENTS

Figure 1:
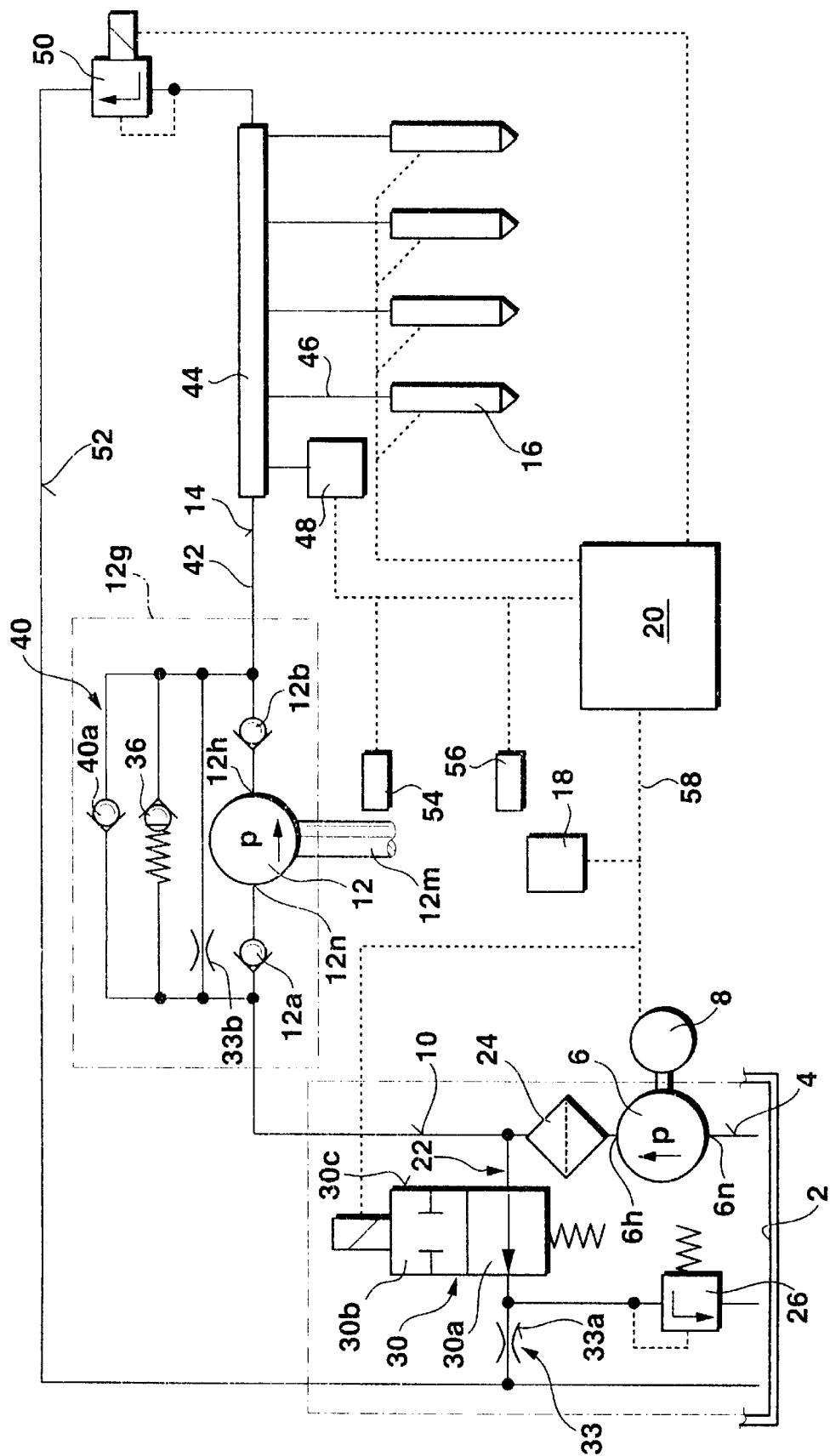
FIGS. 1 and 2 each show one selected, especially advantageously embodied exemplary embodiment of the fuel supply system.

The fuel supply system according to the invention for metering fuel for an internal combustion engine can be used in various types of engines. The same is true for the method according to the invention for operating an internal combustion engine. By way of example, the engine is an Otto engine with external or internal mixture formation and with externally supplied ignition; the engine may be provided with a reciprocating piston (reciprocating piston engine) or with a rotatably supported piston (Wankel engine). The engine may also be a hybrid engine, for instance. In this engine with charge stratification, the fuel-air mixture in the region of the spark plug is enriched enough that reliable ignition is guaranteed, but on average combustion takes place with a highly leaned-down mixture.

Gas exchange in the engine combustion chamber can be done by the four-stroke process or the two-stroke process, for instance. To control the gas exchange in the engine combustion chamber, gas exchange valves (inlet valves and outlet valves) can be provided in a known manner. The engine may be embodied such that at least one fuel valve injects the fuel directly into the engine combustion chamber. Controlling the power of the engine is preferably done by controlling the quantity of fuel delivered by the combustion chamber. However, it may also be provided that the fuel valve pre-stores the fuel at the inlet valve to the combustion chamber. In this version, the air supplied to the combustion chamber for combustion of the fuel is typically controlled with a throttle valve. The power to be output by the engine can be controlled by way of the position of the throttle valve.

The engine has by way of example one cylinder with one piston, or it may be provided with multiple cylinders and a corresponding number of pistons. Preferably, one fuel valve per cylinder is provided.

To prevent this description from being unnecessary extensive, the ensuing description of the exemplary embodiments will be limited to a reciprocating piston engine with four cylinders as the internal combustion engine in question; the four fuel valves inject the fuel, typically gasoline, directly into the engine combustion chamber. The power of the engine is controlled by controlling the injected fuel quantity. At idling and (lower) partial load, charge stratification takes place with fuel enrichment in the region of the spark plug. Outside this region, the mixture is very lean. A full load or upper partial load, the goal is a homogeneous distribution between fuel and air in the combustion chamber.

In the ensuing description, for the sake of simplicity, a distinction will be made between a normal operating state of the engine and a starting process. The term starting process will be understood hereinafter to mean the process from the beginning of starting of the engine until the normal operating state is reached. The term "normal operating state" will be understood hereinafter to mean engine operation under an operating condition, although the operating condition may be quite variable.

FIG. 1 shows a fuel tank 2, an intake line 4, a first fuel pump 6, an electric motor 8, a fuel connection 10, a second fuel pump 12, a pressure line 14, for fuel valves 16, an energy supply unit 10, and an electric or electronic control unit 20. In professional circles, the fuel valves 16 are often referred to as injection valves or injectors.

The first fuel pump 6 has a compression side 6h and a suction or intake side 6n. The second fuel pump 12 has a high-pressure side 12h and a low-pressure side 12n. The fuel connection 10 leads from the compression side 6h of the first fuel pump 6 to the low-pressure side 12n of the second fuel pump 12. A fuel line 22 branches off from the fuel connection 10. Via the fuel line 22, fuel can be returned from the fuel connection 10 directly into the fuel tank 2. There is a filter 24 in the course of the fuel connection 10 between the first fuel pump 6 and the second fuel pump 12.

A pressure control valve 26 and a valve device 30 are provided in the fuel line 22. The pressure control valve 26 and the valve device 30 are operationally connected one after the other. In other words, the pressure control valve 26 and the valve device 30 are connected in series. The valve device 30 can be disposed upstream or downstream of the pressure control valve 26. The pressure control valve 26 and the valve device 30 may also be embodied in the form of a single valve element.

The valve device 30, in the exemplary embodiment shown in FIG. 1, is a switching valve 30c. The switching valve 30c has a first switching position 30a and a second switching position 30b. In the first switching position 30a, fuel from the fuel connection 10 can flow through the fuel line 22 via the pressure control valve 26 into the fuel tank 2. If the valve device 30 is in its second switching position 30b, then the fuel line 22 is blocked.

In the exemplary embodiment shown in FIG. 1, a relief throttle 33a of a relief device 33 branches off downstream of the valve device 30. In this exemplary embodiment, the relief device 33 includes the relief throttle 33a and a relief throttle 33b. The relief throttle 33a carries the fuel into the fuel tank 2, bypassing the pressure control valve 26. The mode of operation of the relief device 33 will be described in further detail later herein.

The first fuel pump 6 is driven by the electric motor 8.

The first fuel pump 6, the electric motor 8, the filter 24, the pressure control valve 26, the valve device 30, and the relief throttle 33a of the relief device 33 are located in the region of the fuel tank 2. These elements are preferably disposed on the outside of the fuel tank 2 or are located inside the fuel tank 2, as is represented symbolically by a dot-dash line.

Via a mechanical transmission means 12m, the second fuel pump 12 is mechanically coupled to an engine output shaft, not shown. Since the second fuel pump is mechanically rigidly coupled to the engine output shaft, the second fuel pump 12 operates in proportion to the rpm of the engine output shaft. The output shaft rpm is highly variable, depending on the instantaneous operating condition of the engine. By way of example, the output shaft is a crankshaft of the engine.

An inlet-side one-way check valve 12a is located in the fuel connection 10, on the low-pressure side 12n of the second fuel pump 12. An outlet-side one-way check valve 12b is provided in the pressure line 14, on the high-pressure side 12h of the second fuel pump 12. Depending on how the second fuel pump 12 is embodied, the check valves 12a, 12b may optionally be omitted. A prestressed one-way spill valve 36 leads out of the pressure line 14 into the fuel connection 10. The spill valve 36 serves to secure the pressure line 14 against an overload and is normally closed.

Operationally parallel to the second fuel pump 12, an admission device 40 leads from the fuel connection 10 into the pressure line 14. The admission device 40 includes a one-way check valve 40a. The check valve 40a is arranged such that the first fuel pump 6 can pump the fuel into the pressure line 14 without being substantially hindered by the second fuel pump 12. The check valve 40a in the admission device 40 prevents the fuel pumped by the second fuel pump 12 from flowing in reverse from the pressure line 14 back into the fuel connection 10.

The second fuel pump 12 is located inside a pump housing 12g shown symbolically by dot-dash lines. The check valves 12a, 12b, the spill valve 36, the relief throttle 33b of the relief device 33, and the admission device 40 can also all be located inside the pump housing 12g.

The pressure line 14 leading from the second fuel pump 12 to the fuel valves 16 can be subdivided in simplified form into a line segment 42, a storage chamber 44, and distributor lines 46. The fuel valves 16 are each connected to the storage chamber 44 via a respective distributor line 46. A pressure sensor 48 is connected to the storage chamber 44 and senses the pressure of the fuel at the time in the pressure line 14. In accordance with this pressure, the pressure sensor 48 outputs an electrical signal to the control unit 20.

A pressure valve 50 that is electrically controllable by the control unit 20 is connected to the storage chamber 44 of the pressure line 14. Depending on how the pressure valve 50 is triggered, fuel is carried out of the pressure line 14 into the fuel tank 2 via a return line 52.

The fuel supply system further includes one or more sensors 54 and an accelerator pedal sensor 56. The sensors 54, 56 sense the operating condition under which the engine operates. The operating condition for the engine may be composed of a plurality of individual operating conditions. The individual operating conditions are, for example, air temperature, coolant temperature, oil temperature, engine output shaft rpm, engine exhaust gas composition, and so forth. The accelerator pedal sensor 56 is located in the region of the accelerator pedal and as a further individual operating condition ascertains the position of the accelerator pedal and thus the speed desired by the driver.

The electric motor 8, the switching valve 30c of the valve device 30, the fuel valves 16, the pressure sensor 48, the pressure valve 50 and the sensors 54, 56 are connected over electrical lines 58 to the energy supply unit 18 and to the control unit 20. The electrical line 58 between the fuel valves 16 and the control unit 20 is embodied such that the control unit 20 can trigger each of the fuel valves 16 separately. For the sake of better distinguishing over the other, nonelectrical lines, the electrical lines 58 are symbolically shown as dotted lines.

The first fuel pump 6 is a positive displacement pump, for example, which drives by the electric motor 8 and as a function of its design pumps a certain quantity of fuel per revolution. The pressure of the fuel on the compression side 6h on the first fuel pump 6 will hereinafter be called the feed pressure. The resistance presented to the fuel on the compression side 6h determines the level of the feed pressure. If the fuel can flow out on the compression side 6h without resistance, for instance, then the feed pressure has the value of zero. If the outflow of fuel on the compression side 6h is hindered or very severely restricted, then the feed pressure rises up to a maximum value. The maximum value of the feed pressure depends among other factors on the model of fuel pump 6 used. The maximum value of the feed pressure is 8 to 10 bar, for instance, because at this pressure level, among other factors, the internal leakage of the fuel pump 6 becomes as great as the supply quantity of the fuel pump 6.

In the normal operating state of the engine, or in other words after the process of starting the engine has been completed, the valve device 30 is in its first switching position 30a. While the valve device 30 is in the first switching position 30a, the feed pressure of the fuel in the fuel connection 10 is determined by the pressure control valve 26. The first fuel pump 6 pumps the fuel out of the fuel tank 2 into the fuel connection 10 via the filter 24. The pressure control valve 26 assures that in the normal operating state, the feed pressure of the fuel in the fuel connection 10 is kept largely constant at a normal value, such as 3 bar. The quantity of fuel pumped by the first fuel pump 6 is greater than the quantity of fuel that the second fuel pump 12 draws from the fuel connection 10. The excess fuel quantity flows out of the fuel connection 10 via the pressure control valve 26 in the fuel line 22 back into the fuel tank 2. The feed quantity of the first fuel pump 6 driven by the electric motor 8 is largely constant.

The second fuel pump 12 pumps the fuel out of the fuel connection 10 into the pressure line 14. The feed quantity of the second fuel pump 12 depends on the rpm of the engine output shaft and thus fluctuates considerably.

Depending on the signal of the pressure sensor 48 and the operating condition of the engine, the control unit 20 controls the pressure valve 50. With the aid of the pressure valve 50, the control unit can assure that in the idling and partial load range of the engine, for instance, the pressure in the pressure line 14 is lower than when the engine is operated in the range of its full load. The pressure in the pressure line 14 can be approximately 100 bar, for instance, during the normal operating state.

The flow cross section of the relief throttles 33a, 33b of the relief device 33 is dimensioned such that during the normal operating state, the quantity of fuel that can flow back into the fuel tank 2 via the relief device 33 is so slight that this quantity is imperceptible or hardly perceptible in the fuel connection 10 and the pressure line 14. For effective pressure relief, the relief throttle 33a is required in particular. With a view to the least possible energy consumption, the cross section of the relief throttle 33b in particular is selected to be as small as possible. Optionally, the relief throttle 33b can be dispensed with entirely. How effective pressure relief can still be attained in the pressure line nevertheless will be described in further detail later herein.

When the engine is not in operation, the fuel in the fuel connection 10 and the pressure line 14 is pressure-relieved, both for safety reasons and so that if there is a leak from one of the fuel valves 16, no fuel can reach the engine combustion chamber. With the engine off, the pressure of the fuel in the fuel connection 10 and pressure line 14 is near atmospheric pressure or slightly above it. Depending on the ambient temperature of the fuel connection 10 and the pressure line 14, and depending on the fuel used, when the engine is off there may be a more or less larger vapor bubble in the fuel connection 10 or in the pressure line 14. The vapor bubble may be made up of a plurality of individual bubbles.

In a starting process, especially if the control unit 20, because of an input program, should indicate from sensor signals that a vapor bubble might have formed, then at the onset of the starting process the electric motor 8 driving the first fuel pump 6 is started, and the switching valve 30c of the valve device 30 is switched into the second switching position 30b. The first fuel pump 6 pumps the entire fuel quantity into the fuel connection 10, without any of the fuel being able to flow back into the fuel tank 2 via the fuel line 22. By means of the admission device 40, the fuel pumped by the first fuel pump 6 can also reach the pressure line 14. If because of the input program the control unit 20 should indicate that an operating condition at which scavenging of the pressure line 14 promotes the starting process is involved, then the control unit 20 triggers the pressure valve 50 in such a way that the fuel pumped by the first fuel pump 6 can flow back to the fuel tank 2 via the pressure valve 50. In this scavenging process, the pressure valve 50 is triggered in such a way that a pressure of approximately 0.5 bar, for instance, prevails in the pressure line 14. This scavenging process lasts for one-half second, for instance. After that, the control unit 20 closes the pressure valve 50, and the first fuel pump 6 generates a feed pressure in the fuel connection 10 with a magnitude of 8 to 10 bar, for instance. This feed pressure can also be propagated into the pressure line 14 via the admission device 40. By means of this relatively high feed pressure, the vapor bubble that may possibly be present in the pressure line 14 is compressed.

At the onset of the starting process, the feed quantity of the second fuel pump 12 is zero. Next during the starting process, the feed quantity of the second fuel pump 12 is very slight, and therefore if the first fuel pump 6 were not to eliminate the vapor bubble that might be present, the compression of the possible vapor bubble would last quite a long time, which would substantially delay the starting process. Since the first fuel pump 6 is driven with the electric motor 8, it is possible to begin compression of the vapor bubble before the second fuel pump 12 begins to operate. Moreover, because of the full exploitation of the first fuel pump 6 during the starting process, the second fuel pump 12 is relieved, which also brings about relief of the engine during the starting process. Since during the starting process the engine is brought to speed by an electric starter motor, not shown, relief of the engine also means relief of the starter motor.

Once a period of time programmed into the control unit 20 has elapsed, or as soon as the pressure sensor 48 ascertains that the second fuel pump 12 is assuring the high pressure in the pressure line 14, the valve device 30 is switched back into the first switching position 30a, so that after completion of the starting process, the feed pressure of the first fuel pump 6 in the fuel connection 10 drops to the intended relatively low value, regulated with the pressure control valve 26, of about 3 bar.

Since in the normal operating state the fuel line 22 is opened, successive long-term strain on the first fuel pump 6 is averted, and since in the starting process the fuel line 22 is closed, the capacity of the first fuel pump 6 is relatively heavily loaded only briefly, this has no negative effect on the service life of the first fuel pump 6, and nevertheless the starting process is shortened substantially by the elevation of the feed pressure during the starting process.

As already noted, the fuel connection 10 and the pressure line 14 are intended to be pressure-relieved when the engine is off. This is accomplished by the two relief throttles 33a, 33b of the relief device 33. The relief throttle 33b assures that fuel from the pressure line 14 can escape back into the fuel connection 10. The relief throttle 33a carries the fuel out of the fuel connection 10 into the fuel tank 2. With the engine off, this accomplishes a pressure relief in the pressure line 14 and in the fuel connection 10.

During the starting process, the first fuel pump 6, via the admission device 40, determines the pressure of the fuel in the pressure line 14 and in the distributor lines 46 at the inlet to the fuel valves 16. During the starting process, the pressure in the pressure line 14 is not regulated by any valve; instead, the maximum pressure that can be made available by the first fuel pump 6 prevails. For production-associated and wear-related reasons, this pressure in the pressure line 14 made available during the starting process by the first fuel pump 6 is variable. The pressure can be sensed by the pressure sensor 48. To assure that the quantity of fuel injected by the fuel valves 16 into the engine combustion chambers exactly matches the intended value, despite the variably high pressure in the pressure line 14, it is proposed that the opening time of the fuel valves 16 for injecting the fuel be controlled as a function of the pressure sensed by the pressure sensor 48. In other words, at relatively high pressure in the pressure line 14 during the starting process, the opening time of the fuel valves 16 is shorter, and at relatively low pressure in the pressure line 14 the opening time of the fuel valves 16 is longer.

Figure 2:
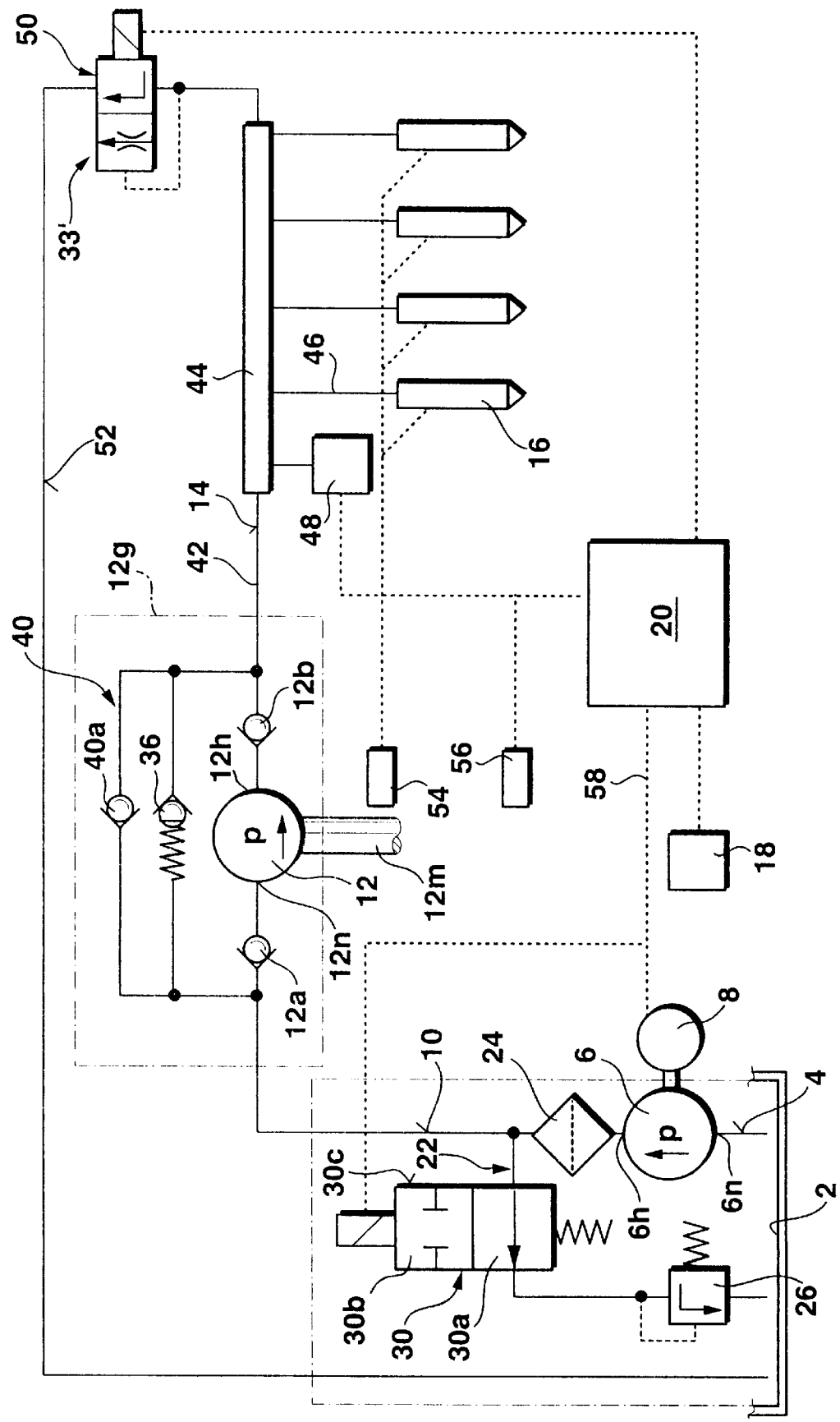

FIG. 2 shows a further preferred selected, advantageous exemplary embodiment.

In all the drawing figures, elements that are the same or function the same are provided with the same reference numerals.

As long as nothing to the contrary is mentioned or shown in the drawing, what is mentioned and shown in conjunction with any one of the drawing figures applies to the other exemplary embodiments as well. If not otherwise stated in the description, the details of the various exemplary embodiments can be combined with one another.

Instead of the relief device 33 having the relief throttles 33a, 33b (FIG. 1), the pressure valve 50 can also perform the function of a relief device 33' (FIG. 2). For instance, the pressure valve 50 can be embodied such that when the engine is off, the pressure valve 50 allows the fuel to escape virtually without pressure into the fuel tank 2 via the return line 52, so that in this variant embodiment the pressure valve 50 is a component of the relief device 33'.

In the triggered state during the starting process and in the normal operating state of the engine, the pressure valve 50 controls the pressure in the pressure line 14. When the system is off, the pressure valve 50 is not triggered or in other words is without current. In the non-triggered state, the pressure in the pressure line 14 can flow to the fuel tank 2, via the pressure valve 50 acting as a relief device 33'.

Figure 3:
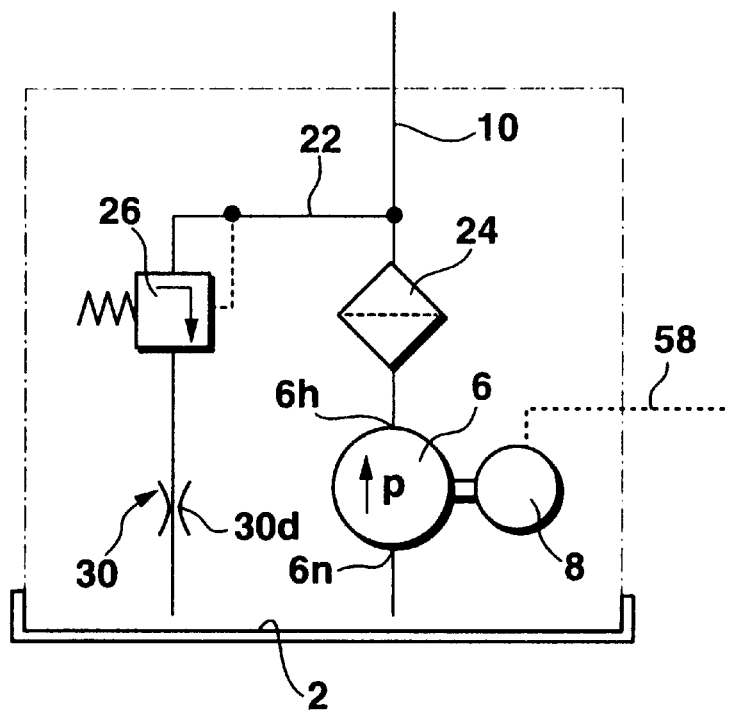
FIGS. 3, 4, 7, 11 and 12 show variously embodied exemplary details of the fuel supply system of the invention.

FIG. 3 as an example on a different scale shows a detail of a further exemplary embodiment that has been modified compared with FIG. 2. The elements not shown in FIG. 3 correspond to the exemplary embodiment shown in FIG. 2.

In the further exemplary embodiment shown in fragmentary form in FIG. 3, the valve device 30 of FIG. 2 has been modified in such a way that the switching valve 30c shown in FIG. 2 is replaced by a fixed throttle valve 30d.

The throttle valve 30d of the valve device 30 is preferably designed such that the flow resistance of the throttle valve 30d rises quadratically as a function of the magnitude of the fuel flowing through it. During the starting process of the engine, a considerable portion of the fuel pumped by the first fuel pump flows through the fuel line 22 back into the fuel tank 2. This fuel is throttled by the throttle valve 30d. This resultant backup pressure is added to the pressure that is maintained by the pressure control valve 26. As a result, the value of the feed pressure in the fuel connection 10 during the starting process rises markedly above the normal feed pressure value, so that during the starting process the vapor bubble that might possibly be present in the pressure line 14 is rapidly compressed.

In the normal operating state, if the second fuel pump 12 draws a considerable portion of the fuel from the fuel connection 10, and as a result only a small portion of the fuel flows back to the fuel tank 2 through the fuel line 22, the throttling performed by the throttle valve 30d is relatively slight, and as a result the feed pressure in the fuel connection 10 during the normal operating state is lower than during the starting process.

The exemplary embodiment shown in FIG. 3 has the advantage that the feed pressure can be raised during the starting process without requiring a controllable valve for the purpose, which makes the expense of manufacturing the fuel supply system substantially simpler. This advantage is so great that in many applications of the fuel supply system it largely compensates for the relative disadvantage that the feed pressure is somewhat higher in the range of engine idling and lower partial load.

Figure 4:
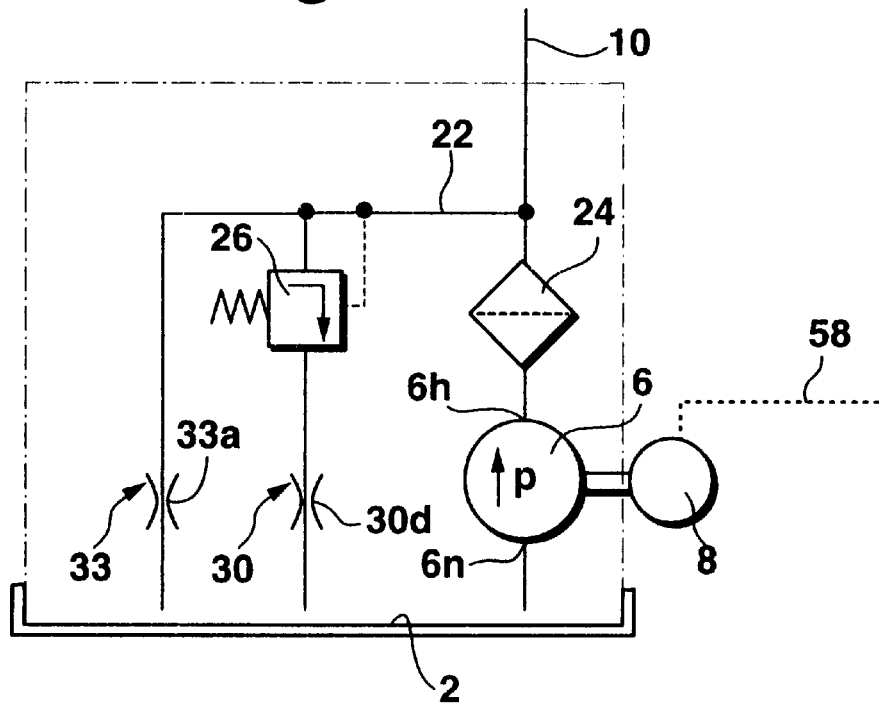

FIG. 4 shows a detail of a further preferred selected exemplary embodiment.

In FIG. 3, the relief throttle 33a, present in FIG. 1, of the relief device 33 is not present. Unlike FIG. 3, FIG. 4 shows an exemplary embodiment in which the relief throttle 33a of the relief device 33 is present.

The throttle valve 30d of the valve device 30 serves to raise the feed pressure in the fuel connection 10 during the starting process. The reason for the relief throttle 33a of the relief device 33 is to lower the pressure in the fuel connection 10 and in the pressure line 14 after the engine has been shut off. Since the flow cross section of the relief throttle 33a is relatively small, so little fuel can flow out of the fuel connection 10 into the fuel tank 2 through the relief device 33 that this relief device 33 can be ignored while the fuel pump 6 is operating.

The flow cross section of the relief throttle 33a of the relief device 33 is dimensioned substantially smaller than the flow cross section of the throttle valve 30d of the valve device 30.

Figure 5:
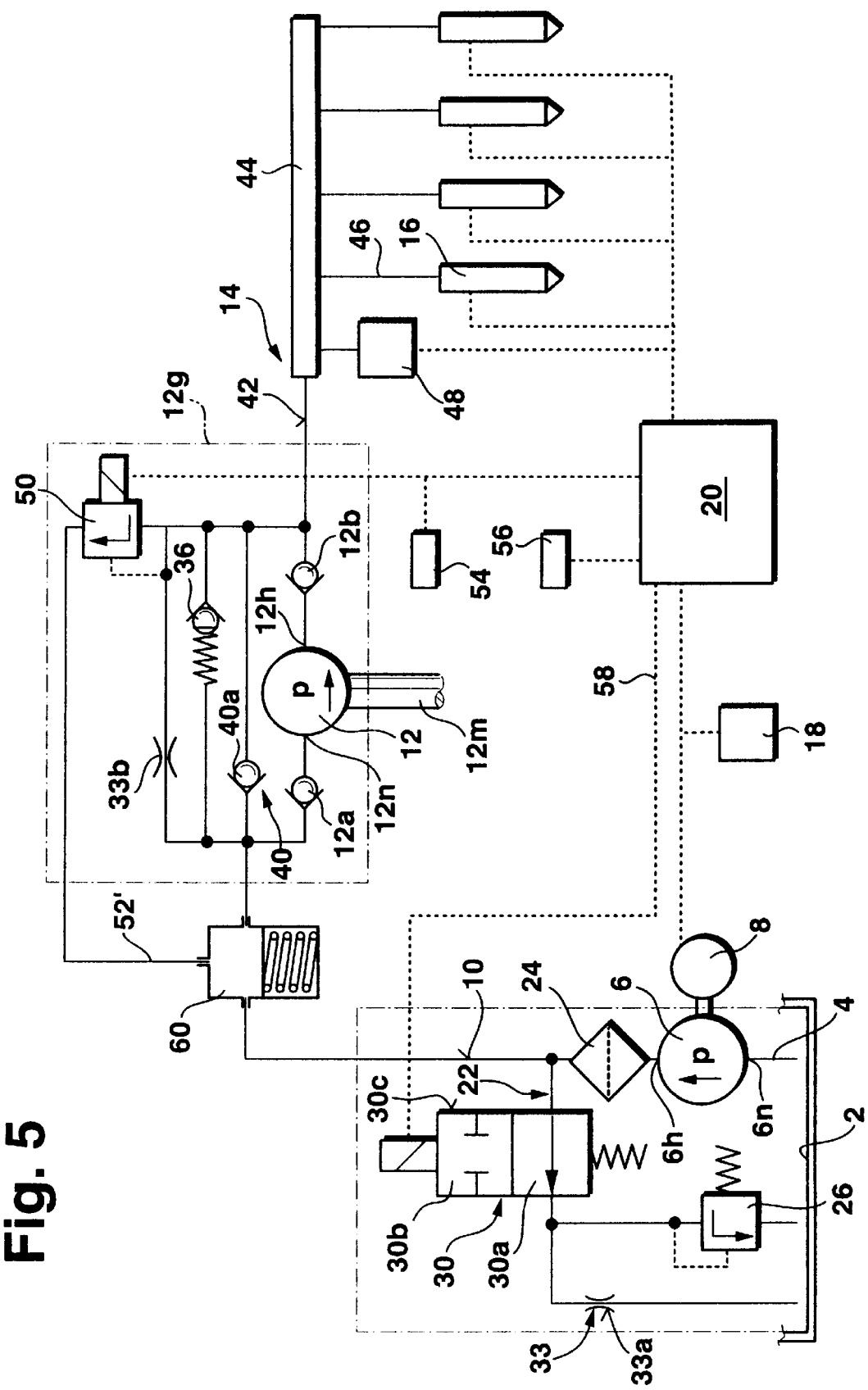
FIGS. 5, 6 and 8–10 show further selected, especially advantageous exemplary embodiments of the invention.

FIG. 5 shows a further preferred selected exemplary embodiment.

Compared with FIG. 1, in the version shown as an example in FIG. 5, the pressure valve 50 is integrated with the pump housing 12g. The fuel flowing out through the pressure valve 50 flows through a return line 52' into the fuel connection 10 between the first fuel pump 6 and the second fuel pump 12. To avoid cavitation on the low-pressure side 12n of the second fuel pump 12, a damping reservoir 60 is provided in the fuel connection 10.

Since the return line 52' leads not into the fuel tank 2 but into the fuel connection 10, advantageously long lines are not needed to carry the fuel, with the advantage that less heated fuel reaches the fuel tank 2.

Except for the differences described, the mode of operation of the exemplary embodiment shown in FIG. 5 is like the mode of operation of the exemplary embodiment shown in FIG. 1.

Figure 6:
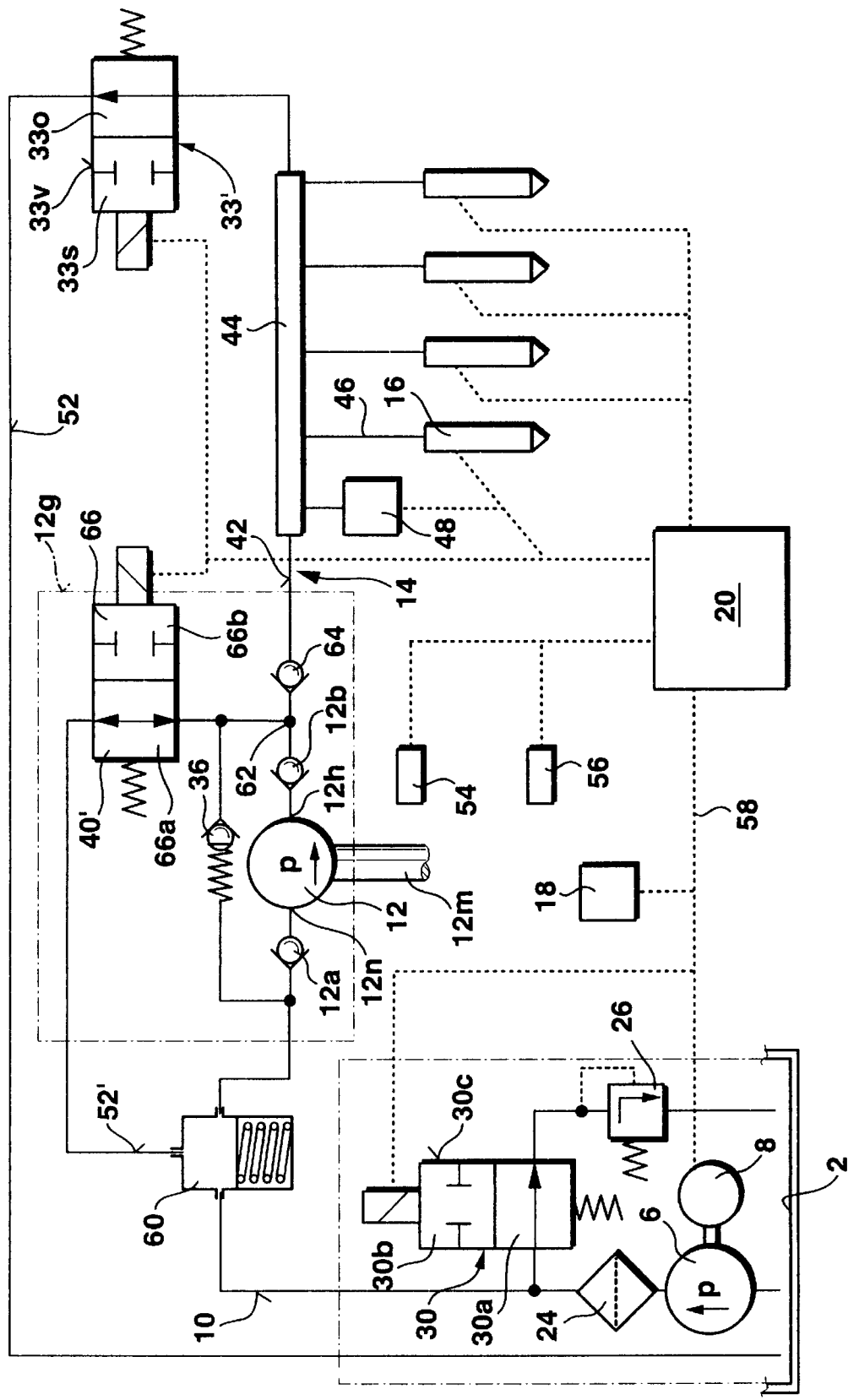

FIG. 6 shows a further preferred selected advantageous exemplary embodiment.

In the exemplary embodiment shown in FIG. 6, there is a branch 62 in the line portion 42 of the pressure line 14. This is where the return line 52' branches off from the pressure line 14. Just downstream of the branch 62, there is a one-way pressure holding valve 64 in the pressure line 14. In terms of the flow direction, the pressure holding valve 64 is upstream of the storage chamber 44. A pressure switching valve 66 is provided in the course of the return line 52'. The pressure switching valve 66 can be switched over electrically between a first switching position 66a and a second switching position 66b. In the first switching position 66a, the branch 62 and thus the high-pressure side 12h of the second fuel pump 12 can be connected to the fuel connection 10 and thus to the low-pressure side 12n of the second fuel pump 12. In the second switching position 66b, this connection is interrupted.

As has been described for FIG. 1, the admission device 40 with the check valve 40a (FIGS. 1 and 2) assures during the starting process that the feed pressure furnished by the first fuel pump 6 can reach the pressure line 14, bypassing the second fuel pump 12. Since the pressure switching valve 66 in the first switching position 66a connects the fuel connection 10 to the pressure line 14, it is possible to dispense with the check valve 40a (FIGS. 1 and 2) and the relief throttle 33b (FIG. 1) in the exemplary embodiment shown in FIG. 6. In this exemplary embodiment (FIG. 6), the admission device 40 with the check valve 40a (FIGS. 1 and 2) is replaced by an admission device 40' having the pressure switching valve 66.

The pressure sensor 48 transmits a value of the pressure prevailing in the storage chamber 44 of the pressure line 14 to the control unit 20. If the control unit 20, from the information reported by the sensors 54, 56 and from an input program ascertains that the pressure appropriate for the instantaneous operating condition is prevailing in the pressure line 14, then the control unit 20 puts the pressure switching valve 66 into the first switching position 66a (FIG. 6). While the pressure switching valve 66 is in the first switching position 66a, the second fuel pump 12 can circular the fuel from its high-pressure side 12h to its low-pressure side 12n without significant expenditure of energy. During this period of time, dissipation is advantageously especially slight. One skilled in the art understands the term dissipation to mean the conversion of one form of energy into heat energy. The pressure holding valve 64 assures that no fuel can escape backward out of the storage chamber 44 via the pressure switching valve 66 counter to the intended flow direction.

During the normal operating state of the engine, fuel is injected into the engine combustion chambers via the fuel valves 66. As a result, while the pressure switching valve 66 is in its first switching position 66a, the pressure in the storage chamber 44 drops. As soon as the control unit 20, with the aid of the pressure sensor 48, ascertains that the pressure in the storage chamber 44 has dropped below a programmed-in limit value, the control unit 20 switches the pressure switching valve 66 into the second switching position 66b. As a result, with the fuel pump 12 running, the pressure in the storage chamber 44 is raised again, until the pressure sensor 48 again senses adequate pressure and the pressure switching valve 66 is put back into its first switching position 66a.

The quantity of fuel injected into the engine combustion chamber depends on the opening time of the fuel valves 16, i.e., how long these valves are open. The control unit 20 opens and closes the fuel valves 16 in accordance with the quantity of fuel required. The pressure of the fuel in the distributor lines 46 and thus in the storage chamber 44 has a substantial influence on fuel preparation during injection into the combustion chambers and on the injected fuel quantity.

Depending on the engine operating condition, an especially good mode of operation of the engine is obtained if the pressure in the storage chamber 44 is adapted precisely to the current operating condition. At a given engine rpm, for instance, it is expedient if during a heavy load on the engine the pressure in the storage chamber 44 is higher than during a lesser load on the engine.

To enable adapting the pressure of the fuel in the storage chamber 44 to the current operating condition as quickly as possible, the relief device 33' shown in FIG. 6 includes an electrically fast-switching relief valve 33v. With the aid of the control unit 20, the relief valve 33v is actuatable electromagnetically into an open position 33o and a closed position 33s.

If the pressure in the storage chamber 44 is less than a command value programmed into the control unit 20, then the relief valve 33v is in the closed position 33s. If the control unit 20 ascertains that the pressure in the storage chamber 44 must be lowered, for instance because the instantaneous operating condition requires this, then the relief valve 33v is switched into the open position 33o.

To avoid unnecessary dissipation, the control unit 20 is programmed such that in the normal operating state, the pressure switching valve 66 is always switched into the first switching position 66a before the relief valve 33v switches into the open position 33o. Assurance is also provided that before the pressure switching valve 66 switches into its second switching position 66b, the relief valve 33v is in its closed position 33s.

With the engine shut off, the relief valve 33v of the relief device 33' is in its open position 33o, so that all the lines and reservoirs of the fuel supply system are pressure-relieved.

At the beginning of a starting process, the control unit 20 puts the valve device 30 into its second switching position 30b. The pressure switching valve 66 initially remains in its first switching position 66a. In this switching position of the valve 30, the feed pressure in the fuel connection 10 rises up to the pressure that at maximum can be made available by the first fuel pump 6. Because the pressure switching valve 66 is in its first switching position 66a, this elevated feed pressure in the fuel connection 10, passes unhindered through the second fuel pump 12 into the pressure line 14. Depending on the temperature reported to the control unit 20, the control unit 20 can decide whether the relief valve 33v should initially remain open at the onset of the starting process or be closed immediately by being switched into its closed position 33s. It is expedient to program the control unit 20 in such way that at especially low temperatures, the relief valve 33v initially remains in the open position 33o, but at a higher temperature at the onset of the starting process the relief valve 33v is switched immediately into its closed position 33s. In a cold start, in other words when the engine housing temperature is low, the pressure line 14 is initially scavenged along with the storage chamber 44. This scavenging takes approximately one-half second. In a hot start, that is, if the engine housing is at a high temperature, this scavenging process is omitted, in order to make the starting process as short as possible. After the possibly inserted scavenging process, the relief valve 33v is switched into the closed position 33s during the starting operation. With the relief valve 33v closed, the elevated feed pressure can propagate as far as the storage chamber 44 and the fuel valves 16. In a hot start, the elevated feed pressure suffices to achieve adequate preparation on injection of the fuel through the fuel valves 16. At especially low temperatures, that is, in a cold start, it may happen that the maximum possible feed pressure of the first fuel pump 6 is not sufficient to achieve adequately good preparation of the fuel injected through the fuel valves 16. In that case, it is necessary during the starting process, after a brief waiting period, to reverse the pressure switching valve 66 into the closed, second switching position 66b. As a result, the second fuel pump 12, driven by the starter motor via the mechanical transmission means 12m, can raise the pressure in the fuel line 14 far enough that adequate fuel preparation can be counted on. This is the case at approximately 20 bar, depending on the temperature. If in the cold start the pressure in the pressure line 14 has built up sufficiently by means of the second fuel pump 12 driven by the starter motor, then during the starting process the valve device 30 can be switched back into the opened, first switching position 30a. This spares the first fuel pump 6 during the starting process as well.

Since the first fuel pump 6 pumps substantially more fuel than the second fuel pump 12, which is driven relatively slowly solely by the starter motor during the starting process, the valve device 30 together with the admission device 40 or 40' affords the advantage that the pressure of the fuel rises substantially faster in the pressure line 14, and thus the starting process can be substantially shortened. Only at especially low temperatures is it necessary to wait until the pressure in the pressure line 14, with the aid of the second fuel pump 12, has been raised above the feed pressure. Since starting must be done substantially more often at higher temperatures, the valve device 30 offers the advantage for the majority of starts that the starting process will take little time. After the conclusion of the starting process, or in other words during the normal operating state, the switching valve 30c of the valve device 30 is in the open, first switching position 30a.

The function of the admission device 40 can also be integrated directly into the second fuel pump 12, if a pump is used that presents no hindrance or only insignificantly hinders a flow of fuel from the low-pressure side 12n to the high-pressure side 12h. In that case, the check valve 40a (FIGS. 1, 2, 5) can be omitted. The same is true for the relief throttle 33b (FIGS. 1, 5) of the relief device 33 if a pump is used that has adequate internal leakage from the high-pressure side 12h to the low-pressure side 12n. The separate relief throttle 33a of the relief device 33 can be omitted without limitation, if the pressure switching valve 26 has adequate internal leakage.

Figure 7:
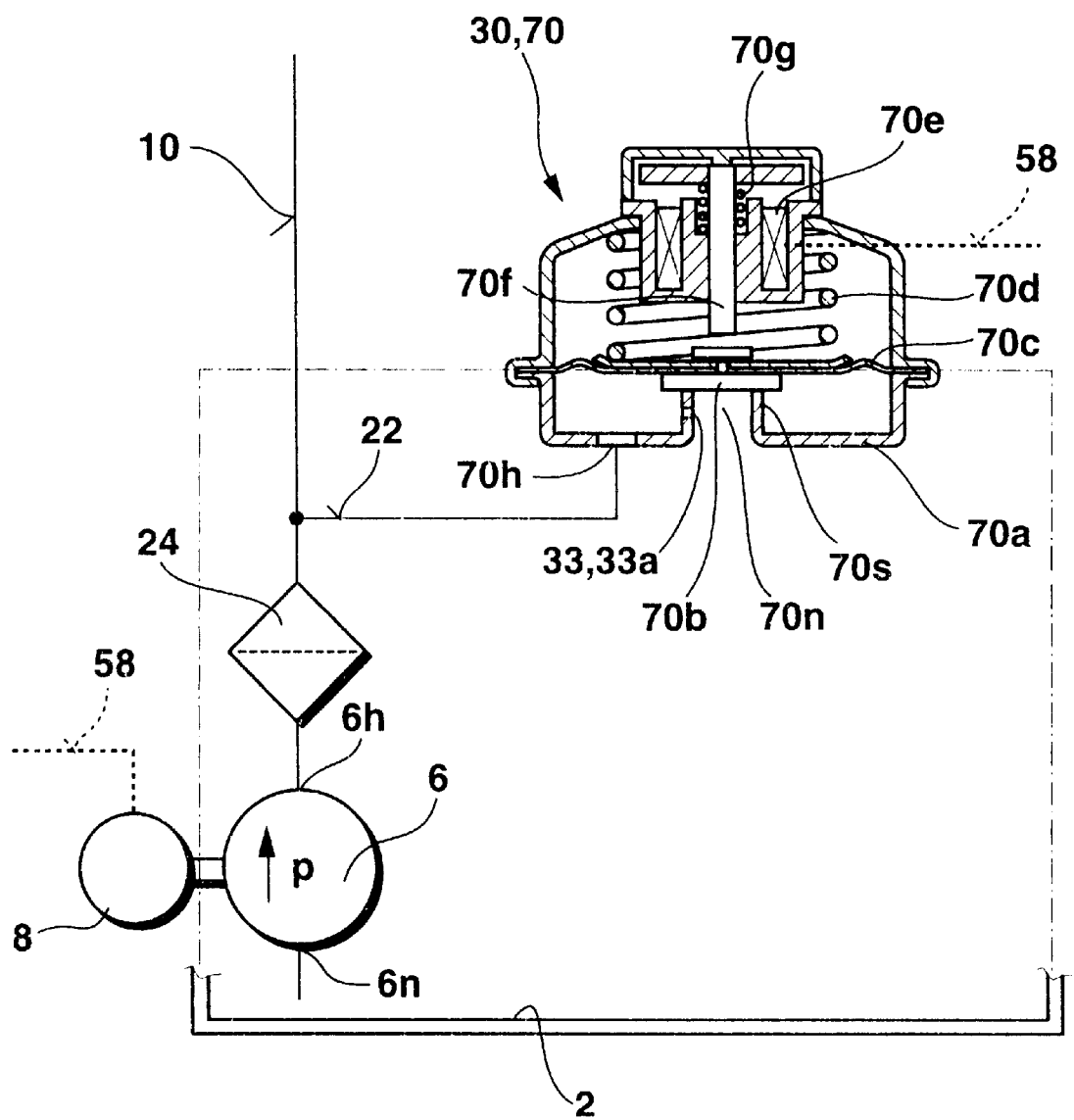

FIG. 7 shows as an example, on a different scale, a detail of a further especially advantageous exemplary embodiment that is modified over FIG. 1.

In the exemplary embodiment shown in FIG. 7, the valve device 30 is embodied in the form of a blockable pressure controller 70.

The blockable pressure controller 70 includes a valve housing 70a, a closing member 70b, a diaphragm 70c, a control spring 70d, an electromagnet 70e, a blocking stop 70f, a valve seat 70s, and a lift spring 70g. There is an inlet, hereinafter called the high-pressure side 78, and a return, hereinafter called the low-pressure side 70n, on the blockable pressure controller 70.

The fuel line 22 leads to the high-pressure side 70h. From the low-pressure side 70n, the fuel can flow out into the fuel tank 2. The blocking stop 70f can be put electromagnetically into a blocking position and an open position. The closing member 70b can block off a connection from the high-pressure side 70h to the low-pressure side 70n. In the open position, the blocking stop 70f makes it possible to lift the closing member 70b from the valve seat 70s, and in the blocking position the closing member 70b cannot lift from the valve seat 70s. If there is no current to the electromagnet 70e, then the blocking stop 70f is in the open position, and the blockable pressure controller 70 can regulate the pressure on the high-pressure side 70h to a predetermined, preadjustable pressure valve. If there is no current to the electromagnet 70e, then the blockable pressure controller 70 operates like a conventional pressure controller. If the pressure on the high-pressure side 70h is lower than the predetermined pressure value, then the control spring 70d presses the closing member 70b against the valve seat 70s provided on the valve housing 70a, and the closing member 70b closes the connection from the high-pressure side 70h to the low-pressure side 70n. If the pressure of the fuel on the high-pressure side 70h rises above the predetermined pressure value, then the closing member 70b lifts from the valve seat 70s. As a result, excess fuel can flow out from the fuel connection 10 into the fuel tank 2. The feed pressure in the fuel line 22 and in the fuel connection 10 is kept at the level of the desired predetermined pressure value. In order for the blockable pressure controller 70 to be able, unimpeded, to control the pressure in the fuel line 22 or in the fuel connection 10, the lift spring 70g assures that the blocking stop 70f has lifted adequately far from the closing member 70b. The control spring 70d presses the closing member 70b against the valve seat 70s, if the pressure on the high-pressure side 70h drops below the predetermined pressure value.

If there is current to the electromagnet 70e, then the blocking stop 70f is put by the electromagnet 70e into the blocking position, counter to the lift spring 70g. In the blocking position, the blocking stop 70f is displaced in such a way against the closing member 70b, that the closing member 70b cannot lift from the valve seat 70s.

In the currentless state of the blockable pressure controller 70 (FIG. 7), the mode of operation of the exemplary embodiment shown in FIG. 7 is equivalent to the mode of operation of the exemplary embodiment shown in FIG. 1, if there the switching valve 30 is in its first switching position 30a (FIG. 1). If there is current to the electromagnet 70e (FIG. 7), then this is equivalent to the function obtained if the switching valve 30c (FIG. 1) is in the second switching position 30b.

In the exemplary embodiment shown in FIG. 1, the valve device 30 and the pressure control valve 26 are in a series circuit. In the exemplary embodiment shown in FIG. 7, the functions of the valve device 30 and pressure control valve 26 (FIG. 1) are replaced by the blockable pressure controller 70 (FIG. 7). This variant embodiment (FIG. 7) has the advantage that fewer components are needed, and that therefore the structural size and construction cost are especially low.

As FIG. 7 shows, the relief throttle 33a of the relief device 33 can be integrated with the valve housing 70a of the blockable pressure controller 70. The relief throttle 33a leads from the high-pressure side 70h to the low-pressure side 70n to the blockable pressure controller 70. The relief throttle 33a extends parallel to the connection that can be blocked off with the closing member 70b.

In the exemplary embodiment shown in FIG. 1, the relief throttle 33a is disposed such that upon actuation of the switching valve 30c into the second switching position 30b, the fuel cannot flow through the relief throttle 33a. In the exemplary embodiment shown in FIG. 7, the relief throttle 33a is not blocked off when there is current to the electromagnet 70e. Nor is such blocking really necessary, since the cross section of the relief throttle 33a is so small that when the first fuel pump 6 is in operation the fuel flow through the relief throttle 33a is negligibly small. The exemplary embodiment shown in FIG. 7 can be modified such that when current is applied to the electromagnet 70e, the closing member 70b additionally covers the relief throttle 33a as well and thus blocks it off, so that when there is current to the electromagnet 70e the relief throttle 33a is closed as well. One skilled in the art can make this additional variant embodiment without needing additional illustration in the drawing to that end.

Figure 8:
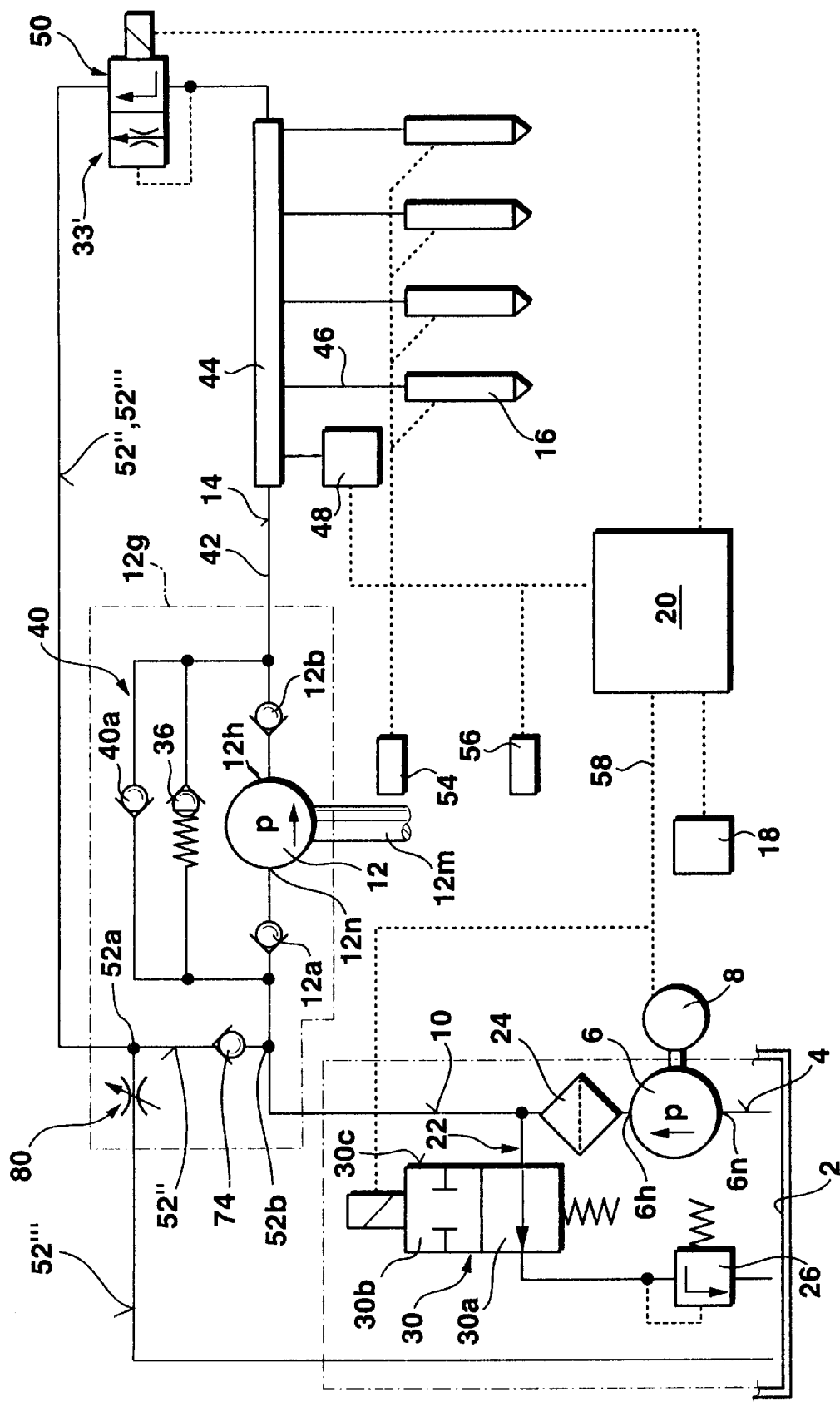

FIG. 8 shows a further, preferred selected advantageous exemplary embodiment.

The return line 52 shown in FIG. 2 has been replaced, in the exemplary embodiment shown in FIG. 8, by a return line 52", which leads out of the storage chamber 44 of the pressure line 14 into the fuel connection 10, and by a return line 52'" leading into the fuel tank 2. The return line 52" leading into the fuel connection 10 and the return line 52'" leading into the fuel tank 2 have a common branch 52a. The two return lines 52" and 52'" are combined into a common hose line between the pressure valve 50, that is, the relief device 33', and the branch 52a.

The return line 52" leads at a line connection 52b into the fuel connection 10. Between the branch connection 52a and the line connection 52b there is a one-way check valve 74. The check valve 74 permits a return flow of the fuel from the pressure line 14 to the low-pressure side 12n of the second fuel pump 12 or high-pressure pump 12. On the other hand, the check valve 74 prevents a flow of the fuel from the fuel connection 10 to the fuel tank 2 via line 52".

In the return line 52'" leading to the fuel tank 2, there is a throttle 80 directly downstream of the branch 52a in the exemplary embodiment shown in FIG. 8.

The cross-sectional area of the throttle 80 can be dimensioned such that some of the fuel flows into the fuel tank 2, and some of the fuel flows into the fuel connection 10. The dimensioning can be done such that the pressure line 14 is always adequately scavenged. Because of the relatively small cross sectional area of the throttle 80, the fuel tends instead to flow into the fuel connection 10, and the vapor bubbles possibly contained in the fuel are thus positively displaced by the throttle 80 into the fuel tank 2. Thus, vapor bubbles can be rapidly removed from the pressure line 14, which in a hot start contributes substantially to a rapid buildup of the pressure in the pressure line 14. Since some of the fuel can flow into the fuel tank 2 via the throttle 80, less fuel is recirculated in the short-circuit mode by the second fuel pump 12. This makes itself felt favorably especially in idling and in the partial-load range. In the version shown in FIG. 8, the danger of cavitation on the low-pressure side 12n of the second fuel pump 12 is substantially reduced, and upon shutoff of the engine vapor bubble development in the pressure line 14 is decreased substantially.

The pressure valve 50 is disposed downstream of the storage chamber 44. This allows recirculation of the fuel through the storage chamber 44, making scavenging of the pressure line 44 substantially more effective.

In the exemplary embodiment shown in FIG. 8, the possibility exists of scavenging the pressure line 14 via both the first fuel pump 6 and the second fuel pump 12; the vapor possibly present preferably flows via the throttle 80 to the fuel tank 2. The throttle 80 is dimensioned in such a way that the fuel that flows to the fuel tank through the return line 52'" in normal operation is so slight that it causes no significant heating of the contents of the fuel tank 2. Because of this quantity of fuel flowing back into the fuel tank 2, it is assured that even in extreme short-circuit operation of the first fuel pump 6, an adequate minimum fuel quantity is fed into the pressure line 14 via the fuel connection 10. As a result, even in extreme short-circuit operation, excessive heating of the fuel in the pressure line 14 is also prevented. The extreme short-circuit mode occurs if the engine is running at high rpm yet because of low load no fuel or only little fuel is injected via the fuel valves 16.

In an especially advantageous embodiment of the invention, the throttle 80 can be provided with a variable cross-sectional area. The throttle 80 may be embodied such that the effective cross-sectional throttle area becomes greater or smaller depending on the operating condition or as needed. For instance, the material that defines the cross-sectional throttle area can be selected such that this material has a certain, defined coefficient of thermal expansion. The material can preferably be selected such that as the temperature of the fuel rises, the shape of the material changes such that the cross-sectional throttle area becomes greater. As a result, the quantity of fuel flowing to the fuel tank 2 becomes greater as the temperature rises.

By way of example, the throttle 80 may also be provided with an adjustable valve body; the throttle 80 is embodied such that upon a displacement of the valve body, the size of the cross-sectional throttle area changes. A so-called expansion element bathed by fuel actuates the valve body. The expansion element displaces the valve body in such a way that as the temperature rises the cross-sectional throttle area becomes greater. Some thought may also be given to controlling the valve body as a function of temperature, optionally via an electromagnet.

Figure 9:
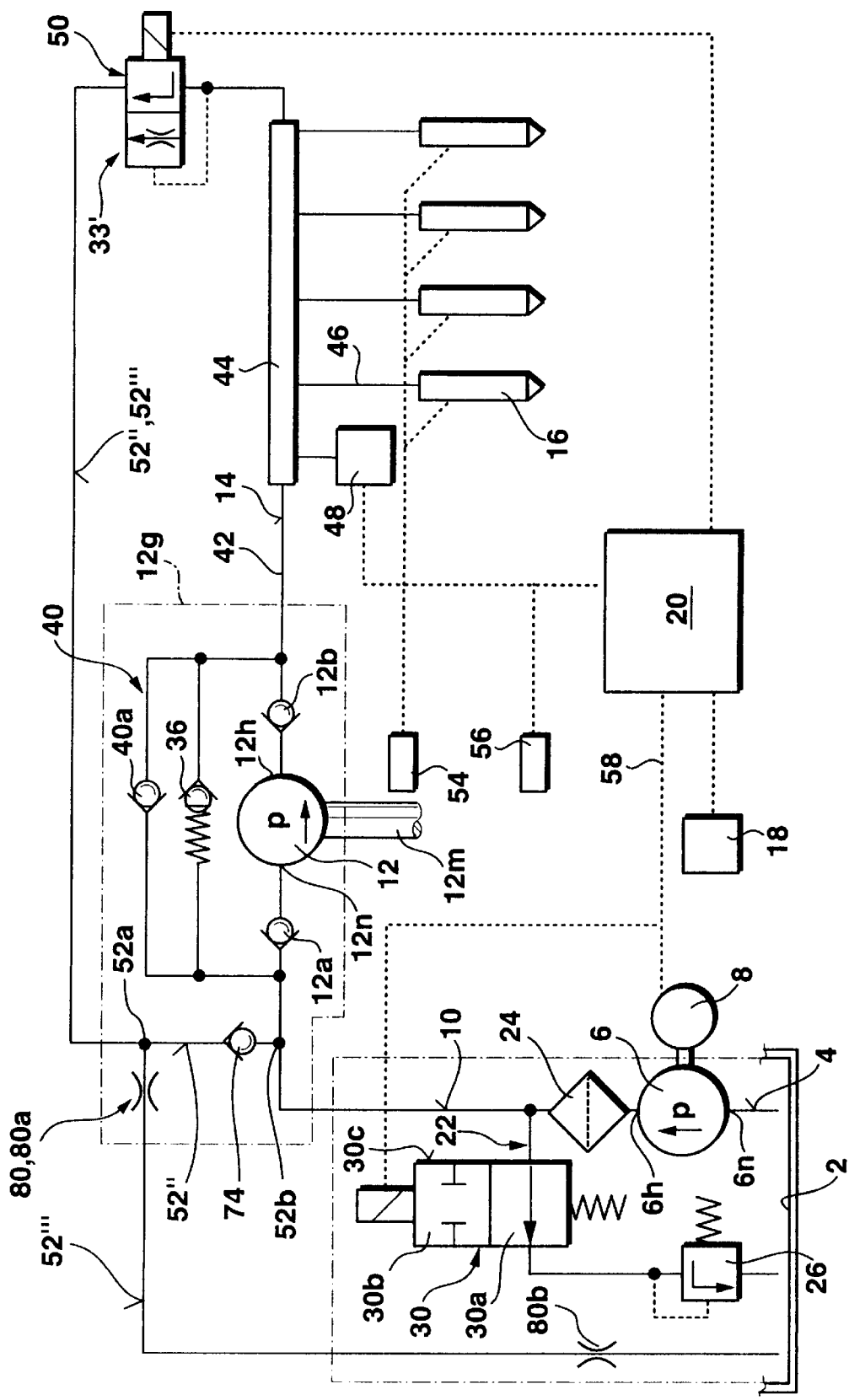

FIG. 9 shows a further preferred selected, especially advantageous exemplary embodiment.

In the exemplary embodiment shown in FIG. 8, the fuel flowing through the return line 52′′′ into the fuel tank 2 is throttled essentially only in the region of the throttle 80 provided in the pump housing 12g.

In the exemplary embodiment of FIG. 9, the throttle 80 includes a first throttle restriction 80a and a second throttle restriction 80b. The first throttle restriction 80a is located in the vicinity of the second fuel pump 12, and the second throttle restriction 80b is disposed at the end of the return line 52′′′ or in the region of the end of the return line 52′′′. Since the throttle 80 includes two throttle restrictions 80a, 80b, or even more than two series-connected throttle restrictions, the cross-sectional throttle area of the individual throttle restriction 80a, 80b can be somewhat greater with the same overall effect, which substantially reduces the vulnerability of the throttle 80 to soiling. In addition, as a result of the second throttle restriction 80b in the region of the fuel tank 2, the pressure in the return line 52′′′ leading to the fuel tank 2 is raised somewhat, so that the fuel vaporizes less in this return line 52′′′, and hence the heat transfer from the fuel to its surroundings is substantially improved, leading to further improved cooling of the fuel. In the exemplary embodiment shown in FIG. 9, the throttle restriction 80a and/or the throttle restriction 80b may also be preferably variable as a function of temperature, as shown in FIG. 8.

Figure 10:
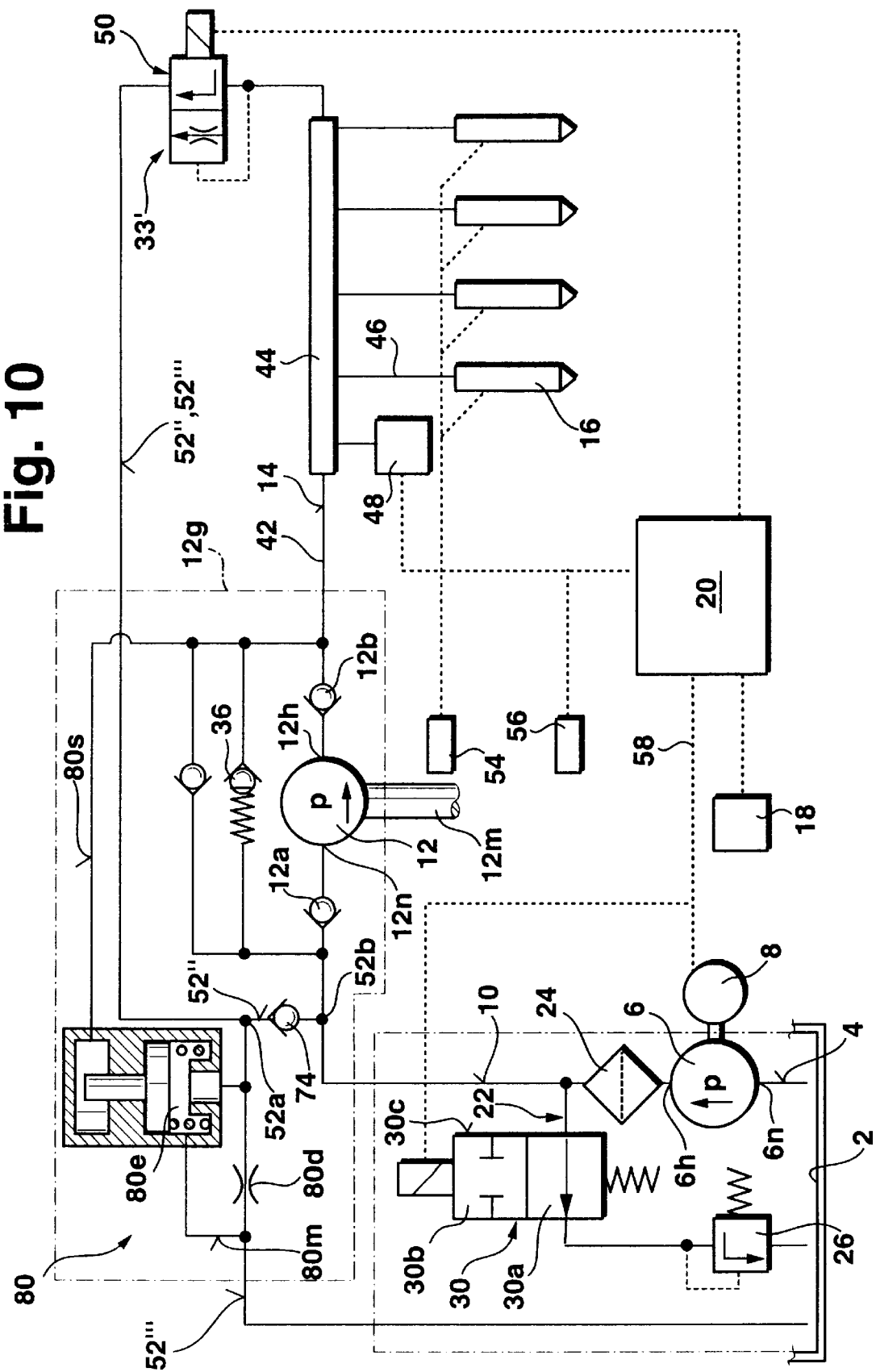
Figure 11:
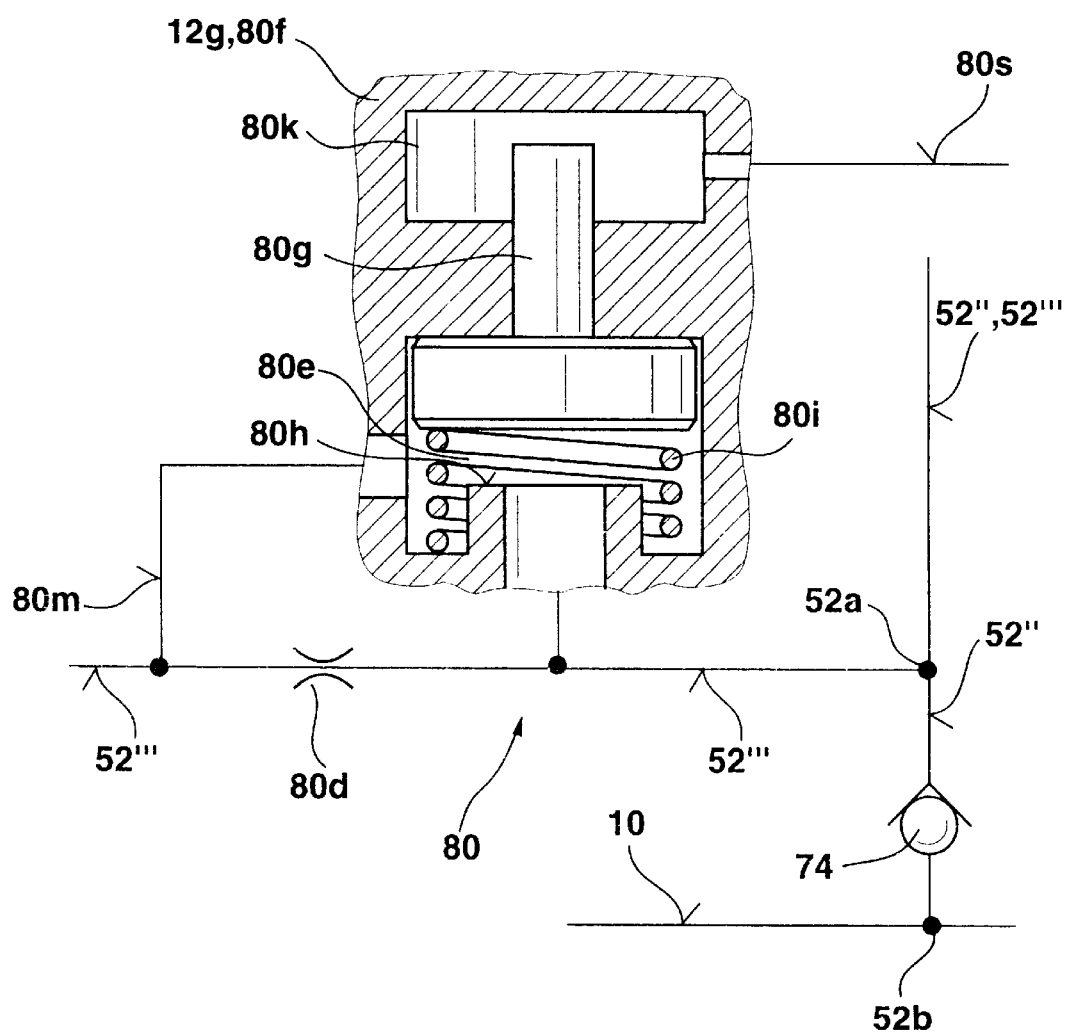

FIG. 10 shows a further preferred selected advantageous exemplary embodiment. In FIG. 11, for the sake of simplicity, a detail of the throttle of FIG. 10 is shown again on a different scale.

In the exemplary embodiment shown in FIGS. 10 and 11, the throttle 80 is variable as a function of pressure.

The throttle 80 is provided downstream of the branch 52a in the return line 52′′′. The throttle 80 includes a constant throttle cross section 80d and a variable throttle cross section 80e (FIG. 11).

To vary the variable throttle cross section 80e, a valve member 80g is displaceably supported in a valve housing 80f. The valve housing 80f also contains a valve seat 80h, a valve spring 80i, and a pressure chamber 80k. The valve housing 80f and the pump housing 12g are preferably physically combined in one common block.

A bypass 80m (FIG. 11) branches off from the return line 52′′′ upstream of the constant throttle cross section 80d. The bypass 80m passes through the valve housing 80f and discharges into the return line 52′′′ downstream of the constant throttle cross section 80d. The valve member 80g is axially displaceable inside the valve housing 80f. The valve spring 80i urges the valve member 80g to lift from the valve seat 80h. Once the valve member 80g has lifted from the valve seat 80h, the bypass 80m is then open. If the valve member 80g is resting on the valve seat 80h, then the bypass 80m is closed. The pressure in the pressure chamber 80k acts upon the valve member 80g and can actuate the valve member 80g against the valve seat 80h counter to the valve spring 80i. The pressure chamber 80k communicates via a control line 80s with the high-pressure side 12h or at some suitable point with the pressure line 14 (FIG. 10). Via the control line 80s in the pressure chamber 80k, the pressure in the line portion 42 or in the storage chamber 44 acts upon the valve member 80g (FIG. 11). Depending on the pressure level in the pressure chamber 80k, the bypass 80m is open or closed. Depending on this, the total flow resistance presented by the pressure-dependently variable throttle 80 is more or less great.

On starting of the engine, the pressure in the pressure line 14 is zero or low, so that the valve member 80g has lifted from the valve seat 80h and the bypass 80m is open. Thus on engine starting, the predominant portion of the fuel can flow out via the throttle 80 into the fuel tank 2, which creates a favorable opportunity for scavenging the pressure line 14 and particularly the storage chamber 44. During engine starting, the pressure in the pressure line 14 rises. If a certain pressure in the pressure line 14 or in the pressure chamber 80k is exceeded, the valve member 80g moves toward the valve seat 80h and closes the bypass 80m. As a result, the flow resistance presented by the throttle 80 increases. This causes the quantity of fuel flowing out to the fuel tank 2 to become less, and a considerable portion of the fuel passes through the check valve 74 to reach the fuel connection 10.

This has the advantage that on starting of the engine, good scavenging of the pressure line 14 is possible, and during normal engine operation the fuel in the fuel tank 2 is heated less severely than would be the case if all the excess pumped fuel were returned to the fuel tank 2.

Figure 12:
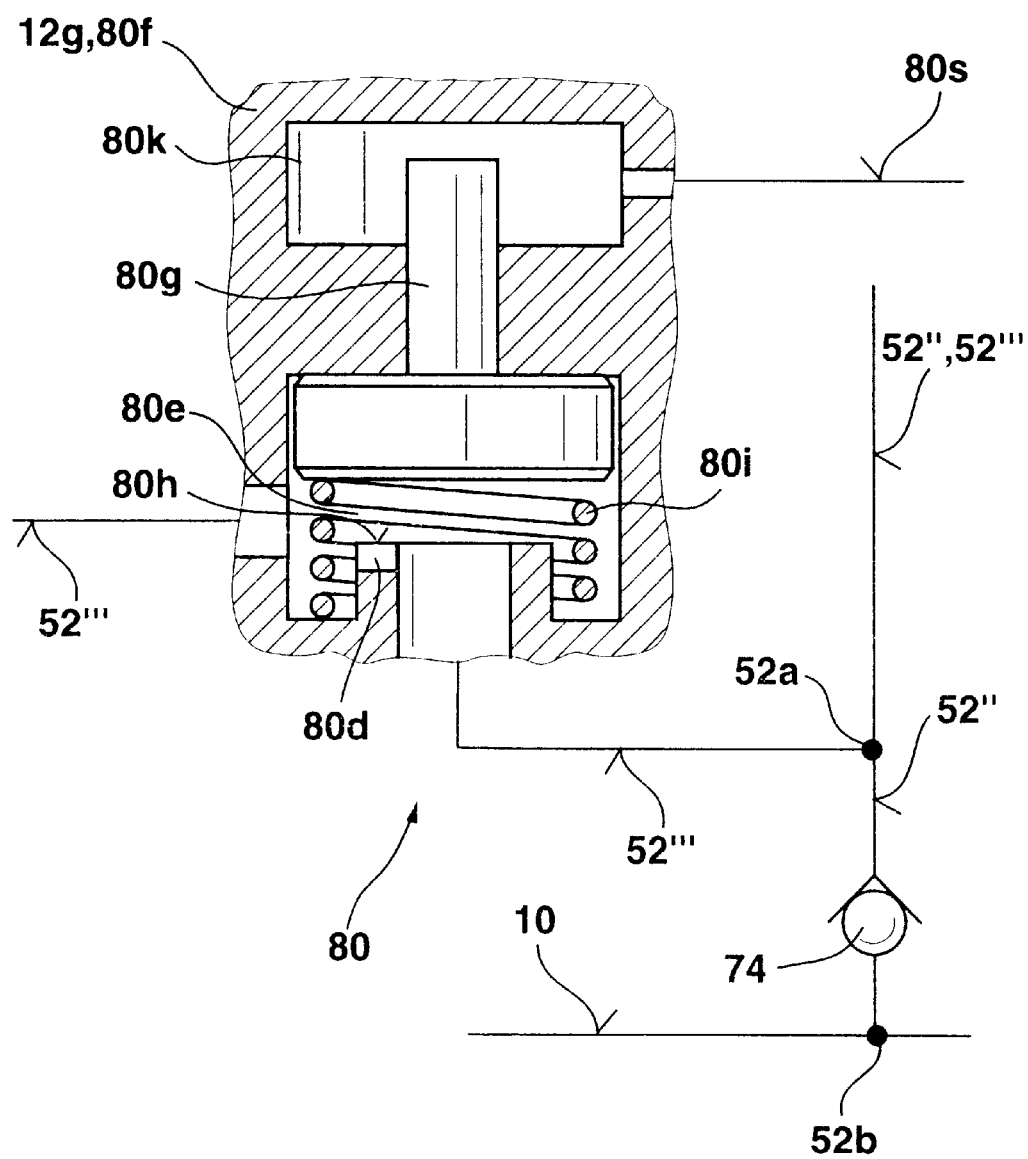

FIG. 12 shows the same region of FIG. 10 as FIG. 11, but with some modifications, selected as examples.

In the exemplary embodiment shown in FIG. 12, the constant throttle cross section 80d is integrated with the region of the variable throttle cross section 80e. By way of example, the valve seat 80h can be provided with a notch, so that even when the valve member 80g is actuated so that it is pressing fully against the valve seat 80h, fuel can flow through the notch and thus the throttle 80 is not completely closed.

In the exemplary embodiment shown in FIG. 10 as well, a throttle restriction, which corresponds to the second throttle restriction 80b shown in FIG. 9, can be provided in the return line 52′′′ in the region of the fuel tank 2.

The pressure in the pressure chamber 80k, which must be present in order for the valve member 80g to be actuated against the valve seat 80h, can be defined arbitrarily by a suitable choice of the valve spring 80i or of the cross section of the valve member 80g on which the pressure in the pressure chamber 80k acts.

It should also be pointed out that in particular, it is also possible to combine the exemplary embodiments shown in FIG. 8 and in FIG. 10. For instance, the throttle 80 can be embodied such that it can be controlled as a function of both pressure (FIG. 10) and temperature (FIG. 8).

In the exemplary embodiment shown in FIG. 5, the branch line 52′ branches from the pressure line 14 directly in the region of the high-pressure side 12h. This offers the advantage of especially short line courses. In the exemplary embodiments shown in FIGS. 1, 2, 6, 8, 9, 10, the return lines 52, 52'', 52''' branch off from the pressure line 14 so far downstream that effective scavenging of the pressure line 14 and especially of the storage chamber 44 is possible.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel supply system for furnishing fuel for an internal combustion engine, comprising a fuel tank, a first fuel pump (6), a second fuel pump (12), at least one fuel injection valve, wherein the first fuel pump (6) pumps the fuel from the fuel tank into a fuel connection and the second fuel pump (12) pumps the fuel from the fuel connection via a pressure line to the fuel injection valve, by way of which the fuel can at least indirectly reach a combustion chamber of the engine, a relief device (33, 33a, 33b, 33') is provided, by which the pressure of the fuel in the pressure line (14) is lowered as a function of at least one engine operating condition, a valve device (30, 30d) is provided that varies a feed pressure in the fuel connection (10) which varies the feed pressure as a function of the engine operating condition, and the valve device (30, 30d) has a flow resistance that is dependent on the flow of fuel flowing through the valve device (30, 30d).

2. The fuel supply system of claim 1, in which the relief device (33, 33b) carries the fuel from the pressure line (14) into the fuel connection (10).

3. The fuel supply system of claim 1, in which the fuel is carried from the pressure line (14) through the relief device (33') into the fuel tank (2), bypassing the fuel connection (10).

4. The fuel supply system of claim 1, in which an admission device (40, 40') is provided, through which the first fuel pump (6) can pump into the pressure line (14) without being substantially hindered by the second fuel pump (12).

5. A fuel supply system for furnishing fuel for an internal combustion engine, comprising a fuel tank, a first fuel pump (6), a second fuel pump (12), and having at least one fuel injection valve, wherein the first fuel pump (6) pumps the fuel from the fuel tank into a fuel connection and the second fuel pump (12) pumps the fuel from the fuel connection via a pressure line to the fuel injection valve, by way of which the fuel can at least indirectly reach a combustion chamber of the engine, a relief device (33, 33a, 33b, 33'), is provided by which the pressure of the fuel in the pressure line (14) is lowered as a function of at least one engine operating condition, a valve device (30, 30d) is provided that varies a feed pressure in the fuel connection (10) which varies the feed pressure as a function of the engine operating condition, the valve device (30, 30d) is provided in a fuel line (22) extending from the fuel connection (10) into the fuel tank (2), and a pressure control valve (26) is provided in the fuel line (22), operationally in series with the valve device (30, 30d).

6. The fuel supply system of claim 5, in which the relief device (33, 33b) carries the fuel from the pressure line (14) into the fuel connection (10).

7. The fuel supply system of claim 5, in which the fuel is carried from the pressure line (14) through the relief device (33') into the fuel tank (2), bypassing the fuel connection (10).

8. A fuel supply system for furnishing fuel for an internal combustion engine, comprising a fuel tank, a first fuel pump (6), a second fuel pump (12), and having at least one fuel injection valve, wherein the first fuel pump (6) pumps the fuel from the fuel tank into a fuel connection and the second fuel pump (12) pumps the fuel from the fuel connection via a pressure line to the fuel injection valve, by way of which the fuel can at least indirectly reach a combustion chamber of the engine, a relief device (33, 33a, 33b, 33') is provided, by which the pressure of the fuel in the pressure line (14) is lowered as a function of at least one engine operating condition, and a pressure holding valve (64) in the pressure line (14) substantially prevents a flow of the fuel from a direction of the fuel valve (16) in a direction of the second fuel pump (12), and a pressure switching valve (66) is provided which branches off between the second fuel pump (12) and the pressure holding valve (66).

9. The fuel supply system of claim 8, in which the relief device (33, 33b) carries the fuel from the pressure line (14) into the fuel connection (10).

10. The fuel supply system of claim 8, in which the fuel is carried from the pressure line (14) through the relief device (33') into the fuel tank (2), bypassing the fuel connection (10).

11. The fuel supply system of claim 8, in which a valve device (30, 30c, 30d) is provided that varies a feed pressure in the fuel connection (10) which varies the feed pressure as a function of the engine operating condition.

12. A fuel supply system for furnishing fuel for an internal combustion engine, comprising a fuel tank, a first fuel pump (6), a second fuel pump (12), and having at least one fuel injection valve, wherein the first fuel pump (6) pumps the fuel from the fuel tank into a fuel connection and the second fuel pump (12) pumps the fuel from the fuel connection via a pressure line to the fuel injection valve, by way of which the fuel can at least indirectly reach a combustion chamber of the engine, a relief device (33, 33a, 33b, 33'), is provided by which the pressure of the fuel in the pressure line (14) is lowered as a function of at least one engine operating condition, and a return line (52', 52'') is provided, leading from the pressure line (14) into the fuel connection (10).

13. The fuel supply system of claim 12, in which the relief device (33, 33b) carries the fuel from the pressure line (14) into the fuel connection (10).

14. The fuel supply system of claim 12, in which the fuel is carried from the pressure line (14) through the relief device (33') into the fuel tank (2), bypassing the fuel connection (10).

15. The fuel supply system of claim 12, in which a valve device (30, 30c, 30d) is provided that varies a feed pressure in the fuel connection (10) which varies the feed pressure as a function of the engine operating condition.

16. A fuel supply system for furnishing fuel for an internal combustion engine, comprising a fuel tank, a first fuel pump (6), a second fuel pump (12), and having at least one fuel injection valve, wherein the first fuel pump (6) pumps the fuel from the fuel tank into a fuel connection and the second fuel pump (12) pumps the fuel from the fuel connection via a pressure line to the fuel injection valve, by way of which the fuel can at least indirectly reach a combustion chamber of the engine, a relief device (33, 33a, 33b, 33') is provided by which the pressure of the fuel in the pressure line (14) is lowered as a function of at least one engine operating condition, a return line (52', 52''') is provided, leading from the pressure line (14) into the fuel tank (2), and a check valve (74) is provided in the return line (52', 52'') leading into the fuel connection (10), and a throttle (80, 80a, 80b, 80d, 80e) is provided in the return line (52, 5''') leading into the fuel tank (2).

17. The fuel supply system of claim 16, in which the relief device (33, 33b) carries the fuel from the pressure line (14) into the fuel connection (10).

18. The fuel supply system of claim 16, in which the fuel is carried from the pressure line (14) through the relief device (33') into the fuel tank (2), bypassing the fuel connection (10).

19. The fuel supply system of claim 5, in which the valve device (30) is a pressure controller (70) that can be blocked by control signals.

20. The fuel supply system of claim 1, in which the valve device (30, 30c, 30d) is provided in a fuel line (22) extending from the fuel connection (10) into the fuel tank (2).

21. The fuel supply system of claim 5, in which an admission device (40, 40') is provided, through which the first fuel pump (6) can pump fuel into the pressure line (14) without being substantially hindered by the second fuel pump (12).

22. The fuel supply system of claim 1, in which the valve device (30) is a pressure controller (70) that can be blocked by control signals.

23. The fuel supply system of claim 13, in which a check valve (74) is provided in the return line (52', 52") leading into the fuel connection (10), and a throttle (80, 80a, 80b, 80d, 80e) is provided in the return line (52, 52'") leading into the fuel tank (2).

24. The fuel supply system of claim 23, in which the throttle (80, 80a) is controllable as a function of temperature.

25. The fuel supply system of claim 23, in which the throttle (80, 80e) is controllable as a function of pressure.

26. The fuel supply system of claim 24, in which the throttle (80, 80e) is controllable as a function of pressure.

* * * * *